US011128691B2

(12) United States Patent
Hurwitz et al.

(10) Patent No.: US 11,128,691 B2
(45) Date of Patent: *Sep. 21, 2021

(54) IN-COLLABORATIVE CONTENT ITEM NOTIFICATIONS IN SHARED COLLABORATIVE CONTENT ITEMS

(71) Applicant: Dropbox, Inc., San Francisco, CA (US)

(72) Inventors: Jacob Hurwitz, San Francisco, CA (US); Colin Dunn, San Francisco, CA (US); Alex J. Palkovic, San Francisco, CA (US); Lars Johnson, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 81 days.

This patent is subject to a terminal disclaimer.

(21) Appl. No.: 16/685,958

(22) Filed: Nov. 15, 2019

(65) Prior Publication Data

US 2020/0084262 A1 Mar. 12, 2020

Related U.S. Application Data

(63) Continuation of application No. 15/396,015, filed on Dec. 30, 2016, now Pat. No. 10,491,658.

(51) Int. Cl.
*G06F 15/16* (2006.01)
*H04L 29/08* (2006.01)

(52) U.S. Cl.
CPC .......... *H04L 67/06* (2013.01); *H04L 67/1097* (2013.01); *H04L 67/26* (2013.01); *H04L 67/306* (2013.01)

(58) Field of Classification Search
CPC ... G06F 40/166; H04L 67/06; H04L 67/1097; H04L 67/26; H04L 67/306; H04L 67/22; H04N 21/4316
See application file for complete search history.

(56) References Cited

U.S. PATENT DOCUMENTS 9,413,708 B1* 8/2016 Michael .............. H04L 65/4015
9,667,676 B1* 5/2017 Lo ......................... H04L 67/104
(Continued)

OTHER PUBLICATIONS

United States Office Action, U.S. Appl. No. 15/396,015, dated Apr. 19, 2019, 29 pages.
(Continued)

*Primary Examiner* — Dustin Nguyen
*Assistant Examiner* — Hao H Nguyen
(74) *Attorney, Agent, or Firm* — Fenwick & West LLP

(57) ABSTRACT

A collaborative content management system allows users to access collaborative content items. When a client device accesses a shared collaborative content item, the client device displays a portion of the collaborative content item that falls within a viewport. The client application generates a notification count of notification events associated with content that is contained in the collaborative content item and positioned below the viewport, and the client device displays the notification count in a graphical element adjacent to a bottom viewport edge. A similar process generates a second notification count of the notification events associated with content positioned above the viewport and displays a graphical element with the second notification count adjacent to the top viewport edge. The user can iteratively select one of the graphical elements to move the content of the collaborative content item to a portion corresponding to the next notification event above or below the viewport.

20 Claims, 13 Drawing Sheets

(56) References Cited

U.S. PATENT DOCUMENTS

| | | | | |
|---|---|---|---|---|
| 9,753,921 | B1* | 9/2017 | DeVincenzi | G06F 16/93 |
| 9,846,528 | B2* | 12/2017 | Eccleston | G06F 3/0481 |
| 9,898,172 | B2* | 2/2018 | Hu | H04L 65/4084 |
| 10,198,413 | B2* | 2/2019 | Kofman | G06F 3/0482 |
| 2011/0252312 | A1* | 10/2011 | Lemonik | G06F 40/186 |
| | | | | 715/255 |
| 2013/0097481 | A1* | 4/2013 | Kotler | G06F 3/04842 |
| | | | | 715/230 |
| 2013/0191720 | A1* | 7/2013 | Simons | G06F 40/169 |
| | | | | 715/234 |
| 2014/0237389 | A1* | 8/2014 | Ryall | G06Q 10/1097 |
| | | | | 715/753 |
| 2014/0280463 | A1* | 9/2014 | Hunter | H04L 67/10 |
| | | | | 709/203 |
| 2014/0289645 | A1* | 9/2014 | Megiddo | G06F 3/048 |
| | | | | 715/753 |
| 2015/0195311 | A1* | 7/2015 | Lemonik | G06F 9/44 |
| | | | | 715/753 |
| 2015/0302338 | A1* | 10/2015 | Zaveri | H04L 51/046 |
| | | | | 705/7.39 |
| 2016/0373396 | A1* | 12/2016 | Sorg | H04L 51/32 |
| 2018/0189369 | A1* | 7/2018 | Baek | G06F 16/27 |
| 2018/0335935 | A1* | 11/2018 | Larson | G06F 3/04842 |

OTHER PUBLICATIONS

United States Notice of Allowance, U.S. Appl. No. 15/396,015, dated Oct. 2, 2019, 28 pages.

* cited by examiner

Docs 602

| Recent docs | Created by me | Shared with |

606A Gettysburg Address
Shared with Abe Lincoln and John Hay · You viewed 5 days ago 606B Draft Opinion: Gibbons v. Ogden
Shared with John Marshall · You viewed 7 days ago · Edited 7 d 606C A Brief History of Steel Production in Ohio
Shared with Robert Jackson · You viewed 10 days ago · Edited 606D Proposed Footnote for Carolene Products Opi
Shared with Harlan F. Stone · You viewed 13 days ago · Edited 606E The Effects of Education on Interstate Comme
Shared with William Rehnquist · You viewed 14 days ago · Edite

604

Draft Opinion: Gibbons v. Ogden

John Marshall commented — 1 day ago
How do you like this ending?

John Marshall commented — 2 days ago
The enumeration . . . .

John Marshall commented — 2 days ago
Please edit this part

A Brief History of Steel Production in Ohio

Robert Jackson commented — 4 days ago
I see a zone of twilight.

Robert Jackson commented — 5 days ago
What does Hugo think about this?

Gettysburg Address

Abe Lincoln commented — 5 days ago
@I_Kant your thoughts?

Draft Opinion: Gibbons v. Ogden

@I_Kant please edit this part — 914

To what commerce does this power extend? The Constitution informs us, to commerce "with foreign nations, and among the several States, and with the Indian tribes."

910
It is not intended to say that these words comprehend that commerce which is completely internal, which is carried on between man and man in a State, or between different parts of the same State, and which does not extend to or affect other States. Such a power would be inconvenient, and is certainly unnecessary.

Comprehensive as the word "among" is, it may very properly be restricted to that commerce which concerns more States than one. The phrase is not one which would probably have been selected to indicate the completely interior traffic of a State, because it is not an apt phrase for that purpose, and the enumeration of the particular classes of commerce to which the power was to be extended would not have been made had the intention been to extend the power to every description.

@I_Kant The enumeration presupposes something not enumerated, and that something, if we regard the language or the subject of the sentence, must be the exclusively internal commerce of a State. The genius and character of the whole government seem to be that its action is to be applied to all the external concerns of the nation, and to those internal concerns which affect the States generally, but not to those which are completely within a particular State, which do not affect other States, and with which it is not necessary to interfere for the purpose of executing some of the general powers of the government. The completely internal commerce of a State, then, may be considered as reserved for the State itself.

But, in regulating commerce with foreign nations, the power of Congress does not stop at the jurisdictional lines of the several States. It would be a very useless power if it could not pass those lines. The commerce of the United States with foreign nations is that of the whole United States. Every district has a right to participate in it. The deep streams which penetrate our country in every direction pass through the interior of almost every State in the Union, and furnish the means of exercising this right. If Congress has the power to regulate it, that power must be exercised whenever the subject exists. If it exists within the States, if a foreign voyage may commence or terminate at a port within a State, then the power of Congress may be exercised within a State.

<u>Powerful and ingenious minds</u>, taking as postulates that the powers expressly granted to the government of the Union are to be contracted by construction into the narrowest possible compass and that the original powers of the States are retained if any possible construction will retain them may, by a course of well digested but refined and metaphysical reasoning founded on these premises, explain away the Constitution of our country and leave it a magnificent structure indeed to look at, but totally unfit for use. They may so entangle and perplex the understanding as to obscure principles which were before thought quite plain, and induce doubts where, if the mind were to pursue its own course, none would be perceived. In such a case, it is peculiarly necessary to recur to safe and fundamental principles to sustain those principles, and when sustained, to make them the tests of the arguments to be examined.

| I_Kant 12/18/16 at 5:18 pm |
|---|
| We still need to work on this section. |
| J_Marshall 12/20/16 at 9:34 am |
| How do you like this ending? |

FIG. 9A

Draft Opinion: Gibbons v. Ogden · Shared with John Marshall different parts of the same State, and which does not extend to or affect other States. Such a power would be inconvenient<sub>918</sub>, and is certainly unnecessary.

Comprehensive as the word "...ong" is, it may very properly be restricted to that commerce which concerns more States than one. The phrase is not one which would probably have been selected to indicate the completely interior traffic of a State, because it is not an apt phrase for that purpose, and the enumeration of the particular classes of commerce to which the power was to be extended would not have been made had the intention been to extend the power to every description.

@I_Kant The enumeration presupposes something not enumerated, and that something, if we regard the language or the subject of the sentence, must be the exclusively internal commerce of a State. The genius and character of the whole government seem to be that its action is to be applied to all the external concerns of the nation, and to those internal concerns which affect the States generally, but not to those which are completely within a particular State, which do not affect other States, and with which it is not necessary to interfere for the purpose of executing some of the general powers of the government. The completely internal commerce of a State, then, may be considered as reserved for the State itself.

But, in regulating commerce with foreign nations, the power of Congress does not stop at the jurisdictional lines of the several States. It would be a very useless power if it could not pass those lines. The commerce of the United States with foreign nations is that of the whole United States. Every district has a right to participate in it. The deep streams which penetrate our country in every direction pass through the interior of almost every State in the Union. 1 new ...rnish the means of exercising this right. If Congress has the power to regulate it, that power must be exercised

FIG. 9B

IN-COLLABORATIVE CONTENT ITEM NOTIFICATIONS IN SHARED COLLABORATIVE CONTENT ITEMS

CROSS REFERENCE TO RELATED APPLICATIONS

This application is a continuation of U.S. application Ser. No. 15/396,015, filed Dec. 30, 2016, now U.S. Pat. No. 10,491,658, which is incorporated by reference in its entirety.

TECHNICAL FIELD

The disclosed embodiments generally relate to providing automatic notifications pertaining to collaborative content items shared over a network. In particular, the disclosed embodiments are directed to providing notifications, in a collaborative content item, for changes outside a visible portion of the collaborative content item.

BACKGROUND

Online collaborative sharing of documents is typically provided by a network-based file sharing computer system that allows multiple users to access and edit the files. Generally, documents are created and edited by a client application and stored on the file sharing computer system, where it can be accessed by other users. Many such systems provide support for tracking changes in the document, such as a change or addition to the document content or an annotation (such as a comment) made to a portion of the document content. Some systems may further provide a user with a notification when certain changes or annotations are made to a document. Typically, a notification about a change simply notifies the user that the change has been made, but not the actual content of the change itself. As a result, when viewing a document, the user does not know where in the document the changed content may be. Accordingly, the user must scroll or page through the document to find the particular change that was the subject of the notification, or use some other tool to find the change. This can be cumbersome to the user, especially when scrolling through longer documents or documents with a large number of changes.

SUMMARY

A collaborative content management system allows users to create, edit, and share collaborative content items among a plurality of other users. Users can interact with the collaborative content management system using a client application on a client device. In various implementations, the client application can be an interface provided through a web browser, through a stand-alone application, or through an overlay, plug-in, or extension to a third party application. When a client device accesses a shared collaborative content item, the client device can display a portion of the collaborative content item, e.g., in a window. The displayed portion of the collaborative content item is the portion contained within a viewport in the window. The viewport is a rectangular area that defines the boundaries of the visible area of the collaborative content item. The client application generates a notification count of notification events associated with content that is contained in the collaborative content item and positioned outside the viewport, and the client device displays the notification count in a graphical element adjacent to a corresponding edge of the viewport. For example, if there are three notification events associated with content positioned below the viewport, then the client device displays a graphical element, such as a visible badge or marker, adjacent to the bottom edge of the viewport with the text "3 notifications." A similar process can be used to generate a second notification count of the notification events associated with content positioned above the viewport and display a graphical element adjacent to the top edge of the viewport with the second notification count.

The user can select one of the graphical elements to move the content of the collaborative content item so that the next notification event above or below the current position of the viewport is in the visible portion of the collaborative content item. For example, if the client application receives a selection of the bottom graphical element, the client application moves the content of the collaborative content item so that the next notification event below the viewport's current position is between the top and bottom edges of the viewport's new position.

In one embodiment, the client application updates the notification counts and the graphical elements if it receives an input to move the content of the collaborative content item so that a different portion of the collaborative content item is displayed. This can occur, for example, if the system receives input such as an interaction with a scroll bar, a scrolling gesture, a paging control, typing new text that extends past the bottom edge of the viewport, selection of a notification that shifts the content of the collaborative content item, or a control event that automatically shifts the content of the collaborative content item.

The client application can also receive new notification events for the collaborative content item while the collaborative content item is being displayed and update the notification counts and graphical elements accordingly. For example, a viewing user and a second user may be viewing the collaborative content item at the same time, and the second user may perform a triggering action (e.g., make a change to the content of the collaborative content item or create a comment) that causes the collaborative content management system to generate a notification informing the viewing user of the action. To generate the notification, the collaborative content management system generates a notification event and one or more notification recipient descriptors for the triggering action. In some implementations, one of the notification recipient descriptors identifies the viewing user. The collaborative content management system sends the notification event to the client device on which the collaborative content item is being displayed. Upon receiving the notification event, the client application regenerates the notification counts and updates the graphical elements.

The present invention has embodiments in a client device and client application, a collaborative content management system, computer program products, and computer implemented methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 shows an example user interface with a plurality of collaborative content items and a list of notifications.

FIG. 9A shows an example of a viewport superimposed over a collaborative content item.

FIG. 9B shows an example user interface with a portion of the collaborative content item and graphical elements adjacent to the top and bottom edges of the viewport.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
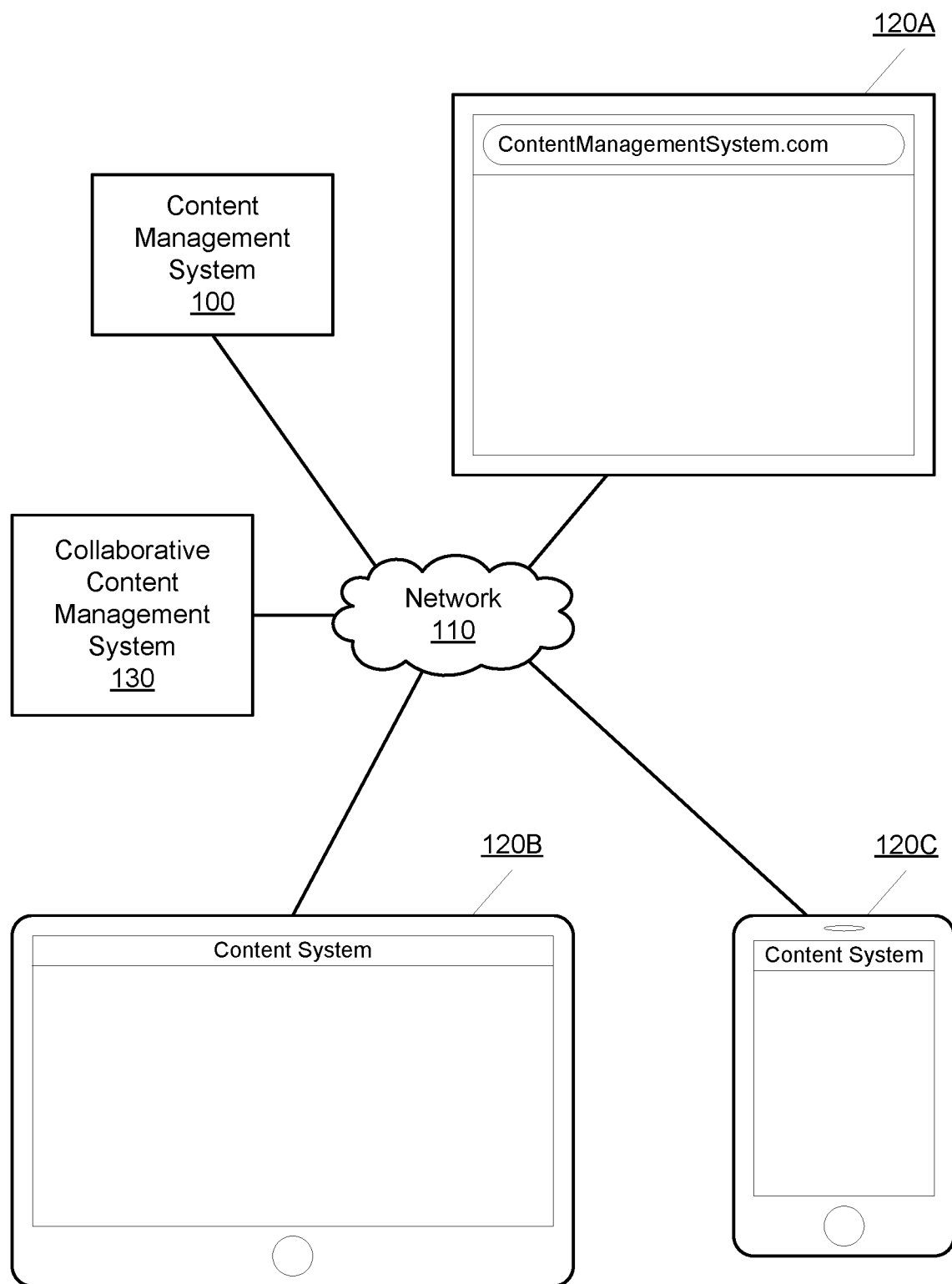
FIG. 1 shows a diagram of a system environment of a content management system and a collaborative content management system according to one embodiment.

FIG. 1 shows a system environment including content management system 100, collaborative content management system 130, and client devices 120A, 120B, 120C (collectively or individually "120"). Content management system 100 provides functionality for sharing content items with one or more client devices 120 and synchronizing content items between content management system 100 and one or more client devices 120.

The content stored by content management system 100 can include any type of content items, such as documents, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, content stored by content management system 100 includes content items created using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaboration interface provided by collaborative content management system 130. In various implementations, collaborative content items can be stored by collaborative content item management system 130, with content management system 100, or external to content management system 100. A collaboration interface can provide an interactive content item collaboration platform whereby users can simultaneously create and edit collaborative content items, add comments in the collaborative content items, and manage tasks within the collaborative content items.

Users may create accounts at content management system 100 and store content thereon by sending such content from client device 120 to content management system 100. The content provided by users and associated with user accounts may have various privileges. For example, privileges can include permissions to: see content item titles; see other metadata for the content item (e.g., location data, access history, version history, creation/modification dates, comments, file hierarchies, etc.); read content item contents; modify content item metadata; modify content of a content item; comment on a content item; read comments by others on a content item; and/or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
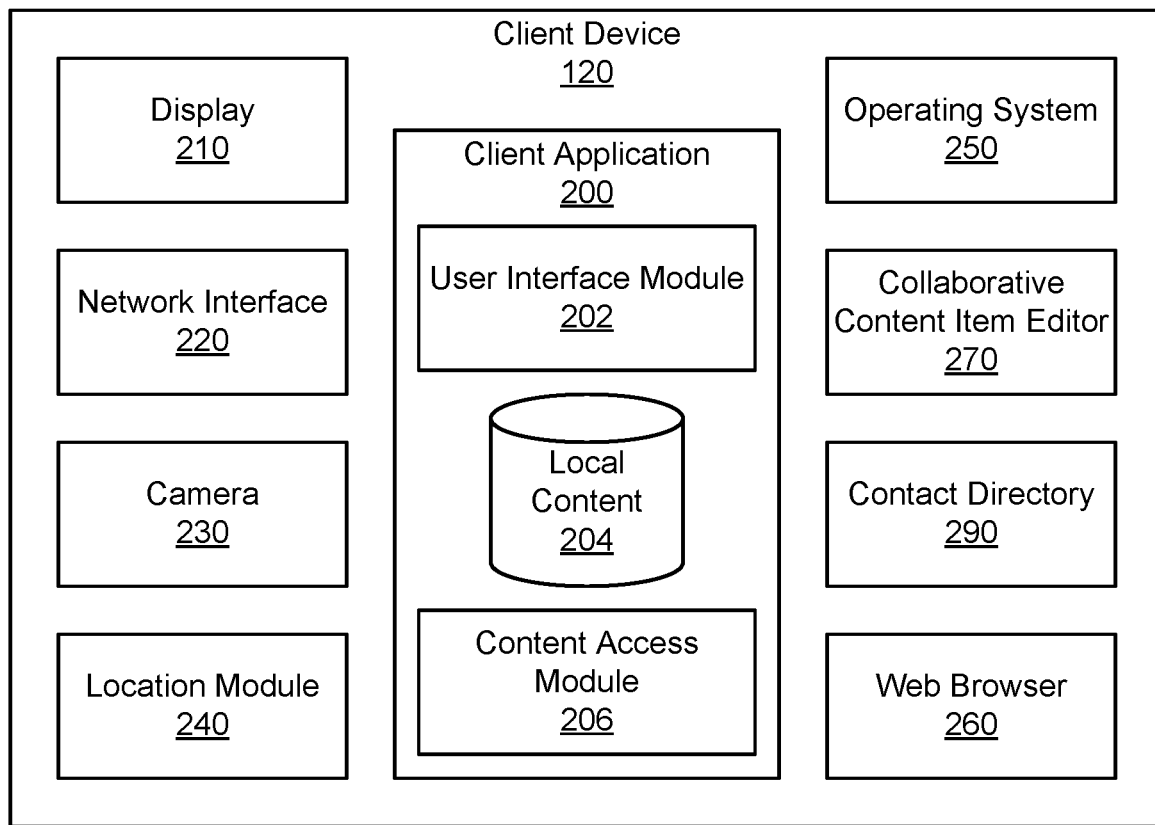
FIG. 2 shows a block diagram of the components of a client device according to one embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other components of a client device 120 that are not material are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules include operating system 250 and optionally a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100 or collaborative content item management system 130. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
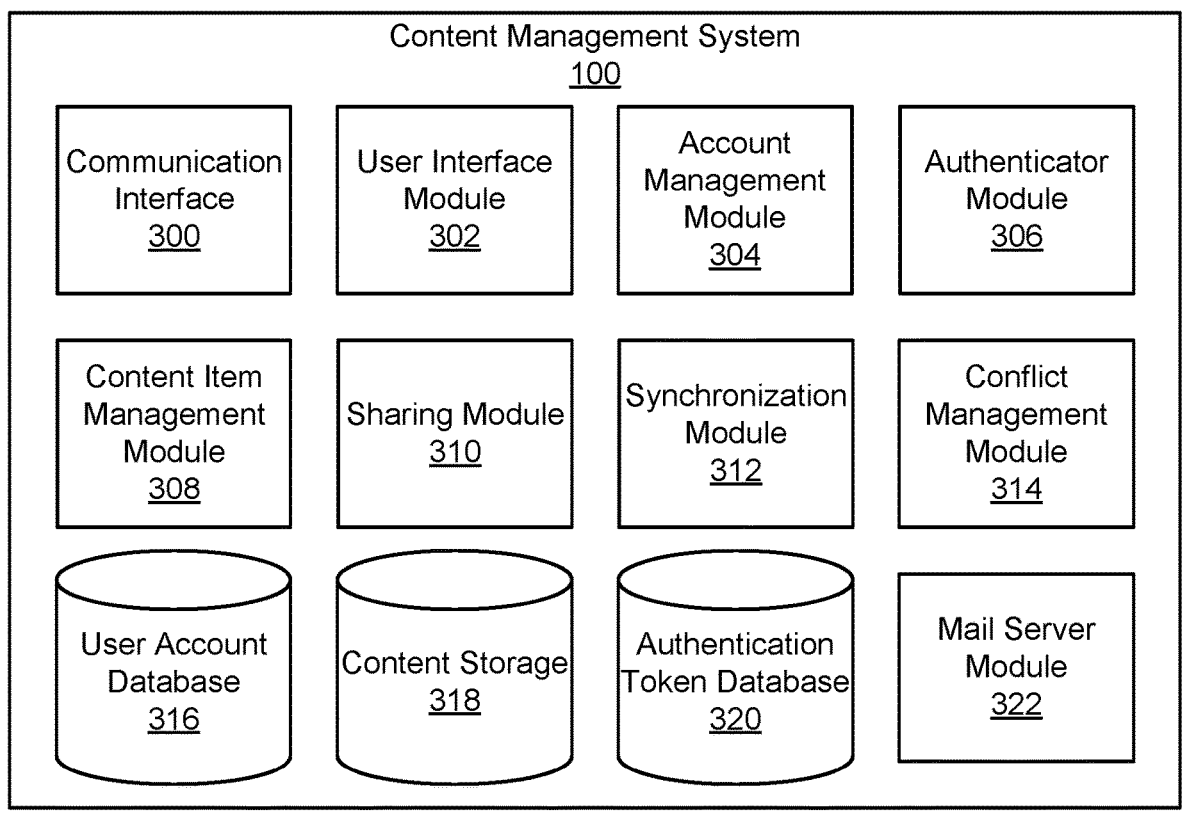
FIG. 3 shows a block diagram of the content management system according to one embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on corresponding identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as: account type (e.g., free or paid); usage information for each user (e.g., file usage history); maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above.

In some cases, a user's permissions for a content item can be explicitly set for that user. A user's permissions can also be set based on: a type or category associated with the user (e.g., elevated permissions for administrator users or manager); the user's inclusion in a group or being identified as part of an organization (e.g., specified permissions for all members of a particular team); and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Collaborative Content Management System

Figure 4:
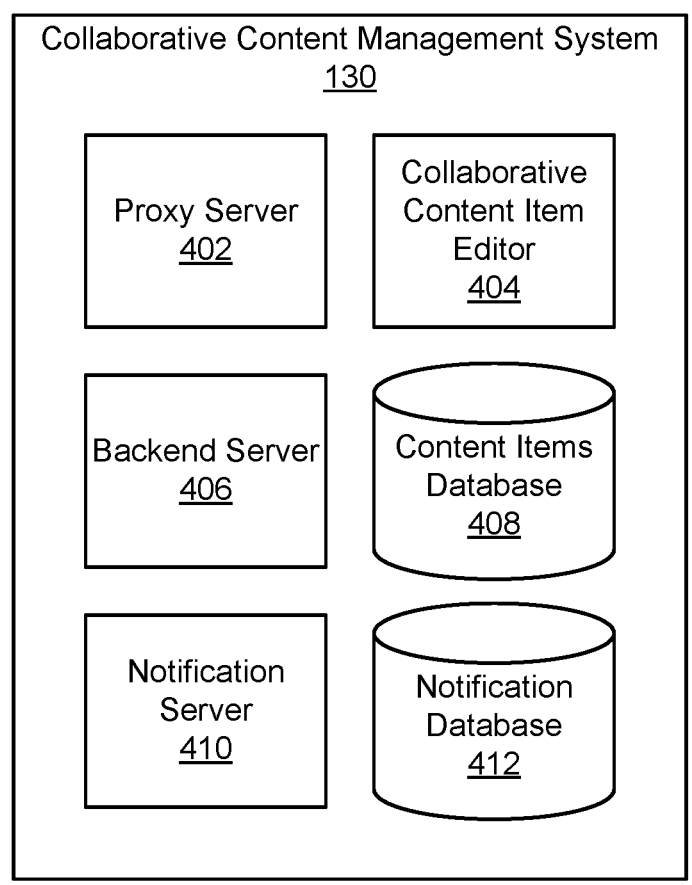
FIG. 4 shows a block diagram of the collaborative content management system according to one embodiment.

FIG. 4 shows a block diagram of the collaborative content management system 130, according to one embodiment. Collaborative content items can be files that users can create and edit using a collaborative content item editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaboration services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and notification server 410. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Content items database 408 contains a plurality of database objects representing collaborative content items, comment threads, and comments. Notification server 410 detects actions performed on collaborative content items that trigger notifications, creates notifications in notification database 412, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items server 404 to client application 200, so the client application can directly communicate with the collaborative content item editor 404 for future requests. In an alternative embodiment, client application 200 initially communicates directly with a specific collaborative content item 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term does not modify collaborative content items and is processed by backend server 406.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Collaborative Content Item Content, Comment Threads, and User Primitives

Figure 5:
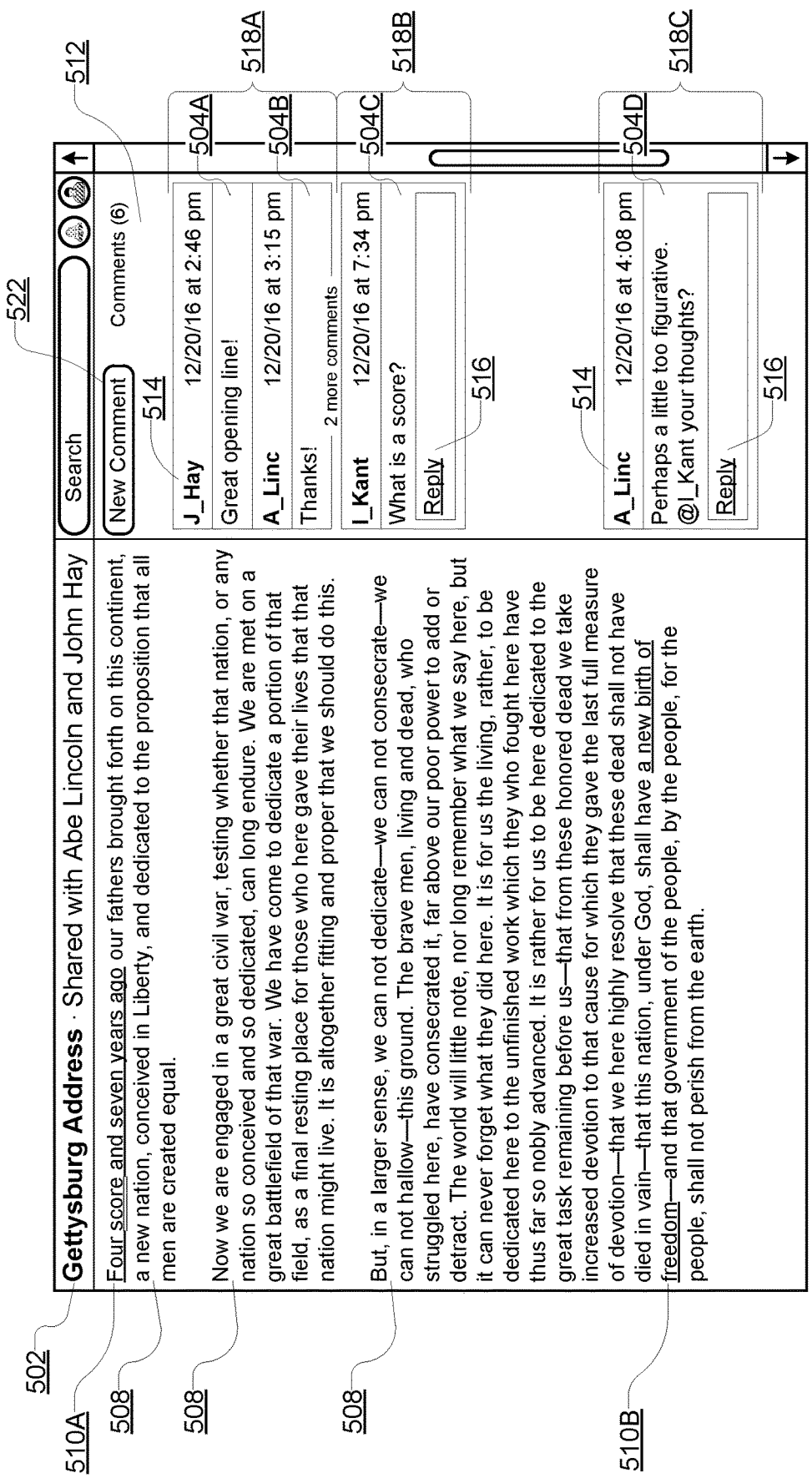
FIG. 5 shows an example user interface with a visible portion of a collaborative content item including various comments.

FIG. 5 shows an example user interface with a portion of a collaborative content item 502 entitled "Gettysburg Address." Generally, a collaborative content item 502 is composed of content such as text, which can be arranged such as in paragraph blocks 508, and may include any other form of media, such as images, videos, spreadsheets, executable or interpretable code, and so forth. The underlying representation of the content can be a list attributed text (e.g., a string of alphanumeric characters where each character or character range has a set of attributes). An attribute can be a (key, value) pair: for example, ("bold", "true"), ("list", "bullet1"), or ("author", authorID). Furthermore, in some implementations, a collaborative content item can be stored as a sequence of changesets. A changeset represents an edit to a particular version of a collaborative content item. Changesets can insert and delete characters and apply attributes to ranges. Thus, a given changeset can be applied to a particular collaborative content item representation, which outputs another collaborative content item representation. For example, a collaborative content item representation "abc\n" and a changeset "insert d at position 2", which when applied would give "abdc\n". By applying all the changesets to a starting collaborative content item representation, the result is a resulting list of attributed text, i.e., the collaborative content item.

Multiple users may access, view, edit, and collaborate on collaborative content items 502 at the same time or at different times. In some embodiments this can be managed as multiple users access a content item through a web interface and there they can work on the same copy of the content item at the same time.

A collaborative content item 502 can have zero or more comments 504. The presence of comments 504 may be indicated by underlined (e.g., colored underlined) portions 510 of text, but any other formatting may be used to indicate the presence of a comment 504 (e.g., lines connecting the comments to the text, comment numbers in superscript form, color highlighting, etc.). The portion 510 of content with which a comment is associated is also called a span. For example, a span may be a length of text (e.g., a number of characters, lines, sentences, paragraphs), a span of an image (e.g., an image or any region within an image), a range of cells in a spreadsheet, a hyperlink, or other types of content that can be associated with spatial extents having defined boundaries. Comments 504 can be associated with overlapping spans; the first and second comments 504A, 504B are applied to the span "Four score and seven years ago" and the third comment 504C is associated with just the span "score."

The comments 504 are arranged in a comment pane 512 positioned to the side of the body of the collaborative content item 502. Each comment 504 has an author 514 (indicated by user name) and a creation date and time. A collection of comments that together form an exchange between users with respect to a single span is a thread 518. Threads are displayed proximate the span that is associated with the thread. In the example of FIG. 5, there are three threads, 518A, 518B, and 518C; thread 518A has a total of four comments (two shown, and "2 more comments" as indicated) and the other threads have one comment each.

A user may create a new comment or reply to an existing comment. To create a comment, a user selects a span of content in the collaborative content item, and activates a comment function, for example via button 522, menu or other input. The new comment 504 is displayed in the comment pane 512, indicating the user name and creation time, and the user may then enter text (or other media) for the comment therein. The user can apply formatting to the content of the comment as done for formatting the content of the collaborative content item. A user may also create a comment to include in a thread by entering content into a reply field 516 in one of the comments 504, such as the most recent comment in a thread 518.

User Interface for Displaying a List of Notifications

FIG. 6 shows an example user interface with a list of collaborative content items 602 and a list of notifications 604. This user interface allows a viewing user to view the collaborative content items to which the viewing user has been granted access (hereinafter "the user's collaborative content items"). As referred to herein, the "viewing user" is the user viewing the user interfaces described herein. In this example, the collaborative content management system 130 has granted the viewing user access to multiple collaborative content items, including the five collaborative content items 606A through 606F shown in the "recent docs" tab 608 of the user interface. The user interface also includes "created by me" and "shared with me" tabs 610, 612 that the viewing user can select to access additional lists of collaborative content items.

When other users make certain types of changes to the viewing user's collaborative content items (discussed below), the collaborative content management system 130 generates a notification of the change. The collaborative content management system 130 defines one or more triggering actions. A triggering action is a change made by another user that causes the collaborative content management system 130 to create a notification about the change and provide the notification to the client device of the viewing user. For example, a triggering action may occur when another user adds or alters a portion of the collaborative content item, or adds a comment to a thread, for example in a thread that already includes a comment added by the viewing user.

The client application 200 receives notifications from the collaborative content management system 130 and can display a notification in a variety of ways. One way of displaying a notification is the notification list 604 shown in FIG. 6. The notification list 604 includes notifications for several of the viewing user's collaborative content items, and it is displayed when the viewing user selects the notification icon 614. In the example shown in FIG. 6, the notifications in the notification list 604 are sorted by the age of collaborative content item, and the notifications for each collaborative content item are sorted from most recent to least recent.

The client application 200 displays each notification in the notification list 604 with notification content and a short phrase indicating whether the notification relates to a comment or a portion of content in the collaborative content item. Although not explicitly shown in FIG. 6, each notification can also include a content span and a notification link. The content span associates the notification with a span of content in the collaborative content item 502. The notification link is a link to the collaborative content item and includes a pointer or other reference to the content span. A user input selecting a notification in the notification list 604 selects the link. The selection of the link causes the client application 200 to open the collaborative content item to a position where the content span is visible. As a beneficial result and improvement in functionality, the user does not have to scroll through the collaborative content item to find the change that was the subject of the notification.

Referring to the final notification 616 in the notification list 604 as an example, the notification content is the user primitive "@I_Kant" and the adjacent text "your thoughts." A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user. In one embodiment, the user primitive takes the form of @username where the "@" symbol is a predetermined token that indicates to the collaborative content management system 130 that the following string "username" is the user name of a system user. If the user selects this notification 616, the notification link causes the client application 200 to open the collaborative content item 502 shown in FIG. 5 to a position where the span 510b is visible.

Notification Database Structures

Figure 7:
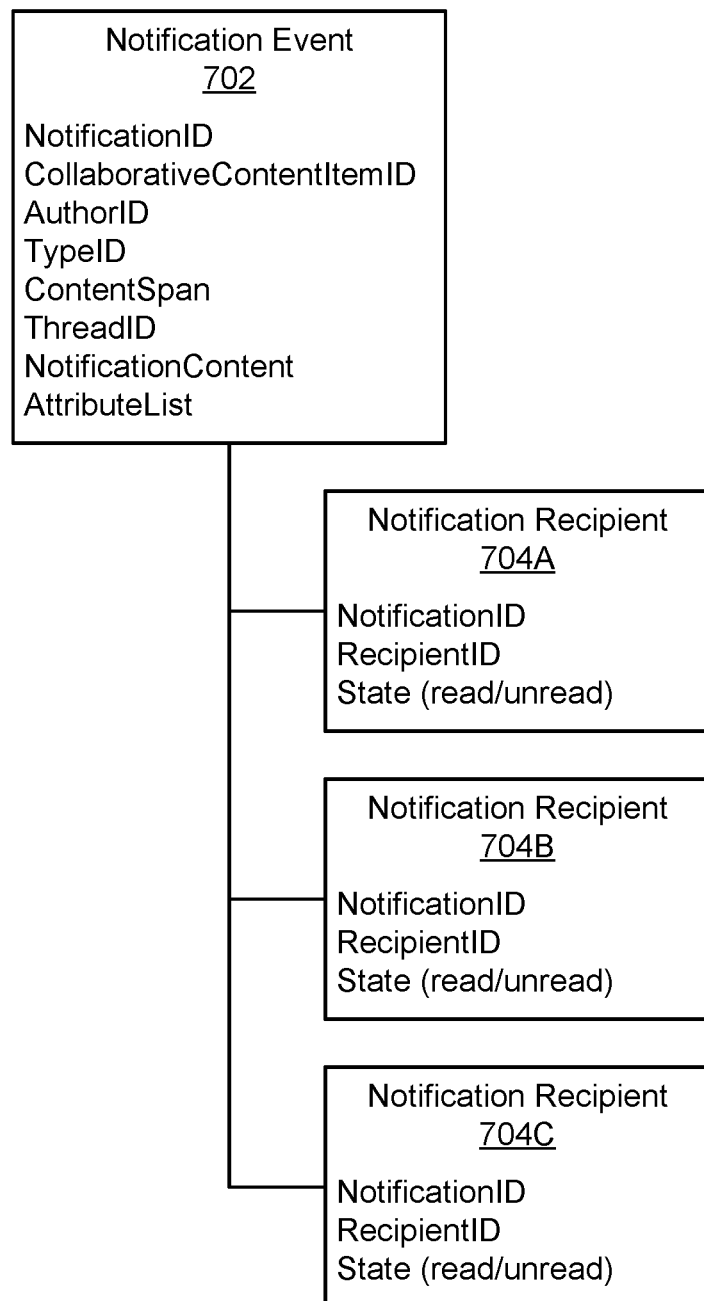
FIG. 7 shows an embodiment of the data structures for notification events and notification recipient descriptors.

The notification database 412 can store notification events and notification recipient descriptors, and FIG. 7 shows an embodiment of the data structures for these two types of data items. The notification database 412 can be implemented in a relational form using separate tables for notification events and notification recipient descriptors, or using objects, BLOBs, files, or other structures.

A notification event 702 is a data item describing a notification that is sent to one or more users. A notification item is composed of a number of elements (equivalently fields, columns, attributes, etc.). In one embodiment the elements are as follows:

NotificationID: a unique identifier assigned by the collaborative content management system 130 to the notification event.

CollaborativeContentItemID: a unique identifier for the collaborative content item that is the subject of the notification.

AuthorID: the userID of the user that generated the notification event.

TypeID: an enumerated variable storing a value indicating whether the subject of the notification is an added comment (either as a new thread or a reply in an existing thread) in the collaborative content item or a change to content in the collaborative content item.

ContentSpan: a delineated portion of the content of the identified collaborative content item to which the notification applies. The delineated portion is defined relative to the type of the content. For example, a content span in text can be defined by the position of the first character in the span, and the length of the content span (in number of characters); a content span in an image can be defined by a bounding region, for example a set of (X,Y) coordinates, relative to the image origin that define a polygon within the region; a content span in a spreadsheet or table can be defined by a range of cells by column and row numbers. For example, the text span (50, 25) indicates a text portion starting at character position 50 within the collaborative content item and running 25 characters in length.

If the subject of the notification is an added comment, then ContentSpan may be the same as the span of the added comment. If the subject of the notification is a change to the content of the collaborative content item (e.g., the addition of the viewing user's user primitive to the content), then ContentSpan may be the portion of the content where the change appears, and may optionally include a small portion of content before and/or after the change (e.g., if the change appears in text content, ContentSpan may optionally include one or two words before and/or after the change).

ThreadID: if TypeID indicates that the subject of the notification is an added comment, ThreadID is a unique identifier for the thread in which the comment appears. If TypeID indicates that the subject of the notification is a change to a portion in the collaborative content item other than a comment, then ThreadID has a null value.

NotificationContent: a string element storing the content of the notification. The content of a notification can include text, as shown in the example notifications of FIG. 6. The content of a notification can additionally or alternatively include non-text content such as images and videos. In one implementation, non-text notification content is stored separately from the notification event 702, and NotifcationContent contains a reference to the content. In another implementation, non-text notification content is stored in the notification event 702 as part of NotificationContent. For example, in addition to a string, NotificationContent may also include an image or video file.

AttributeList: an attribute list element storing the formatting attributes for the content of the notification. The attribute list element is a list of (span=attributeID) pairs, where the attributeID indicates the attribute(s) from an attribute pool (e.g., a data structure associating different attributeID values to different formatting attributes) and the span specifies the number of characters to which the attribute(s) is to be applied when the content is rendered, starting from the end of the previous span, so that the entire length of the content is coded for attributes. For example, the text "Text with bold, italic, and bold italic formatting." would be attribute coded as {10=0, 4=1, 2=0, 6=2, 6=0, 11=1 2, 12=0}, where no formatting is indicated by the value "0", bold is indicated by the value "1", italic is indicated by the value "2".

A notification recipient descriptor 704 is a data item the collaborative content management system 130 creates for each user who will receive a notification described by a notification event. In the embodiment shown in FIG. 7, there are three notification recipient descriptors 704A, 704B, 704C associated with the notification event 702, which indicates that three different users of the collaborative content management system 130 will receive the notification described by notification even 702.

In one embodiment, each notification recipient descriptor 704 includes:

NotificationID: the identifier for the notification event.

RecipientID: an identifier for the user who will receive the notification. In various implementations, the recipient can be any of: i) the author of the collaborative content item containing the notification event; ii) if the notification is about an added comment, the authors of comments included in the thread; iii) the authors of any content included in the content span for the notification event; iv) any user mentioned in the content span of the notification event via a user primitive; v) any user mentioned in a comment, e.g., via user primitive; vi) any user who has opened the collaborative content item containing the notification event; vii) any user who has edited the collaborative content item containing the notification event; or viii) any user who has created an association with the collaborative content item containing the notification event, such as by marking it as a favorite or followed collaborative content item. In some implementations, the recipients for the notification may not be defined specifically for the notification, but instead may be identified dynamically as needed based on, e.g., user identifiers associated with the comments or with the collaborative content item. The inclusion of recipients for each notification allows for fine grain control of which users are notified of, and have access to, specific comments.

State: an enumerated variable storing a value indicating that the identified notification has either been read by the identified recipient user or has not yet been read by the identified recipient user. By default, State has a value of "unread." When an identified recipient user reads the identified notification, the State element for the notification recipient identifier 704 that identifies the recipient user (i.e., in the RecipientID element) changes to a value of "read."

Displaying In-Collaborative Content Item Notifications

Figure 8A:
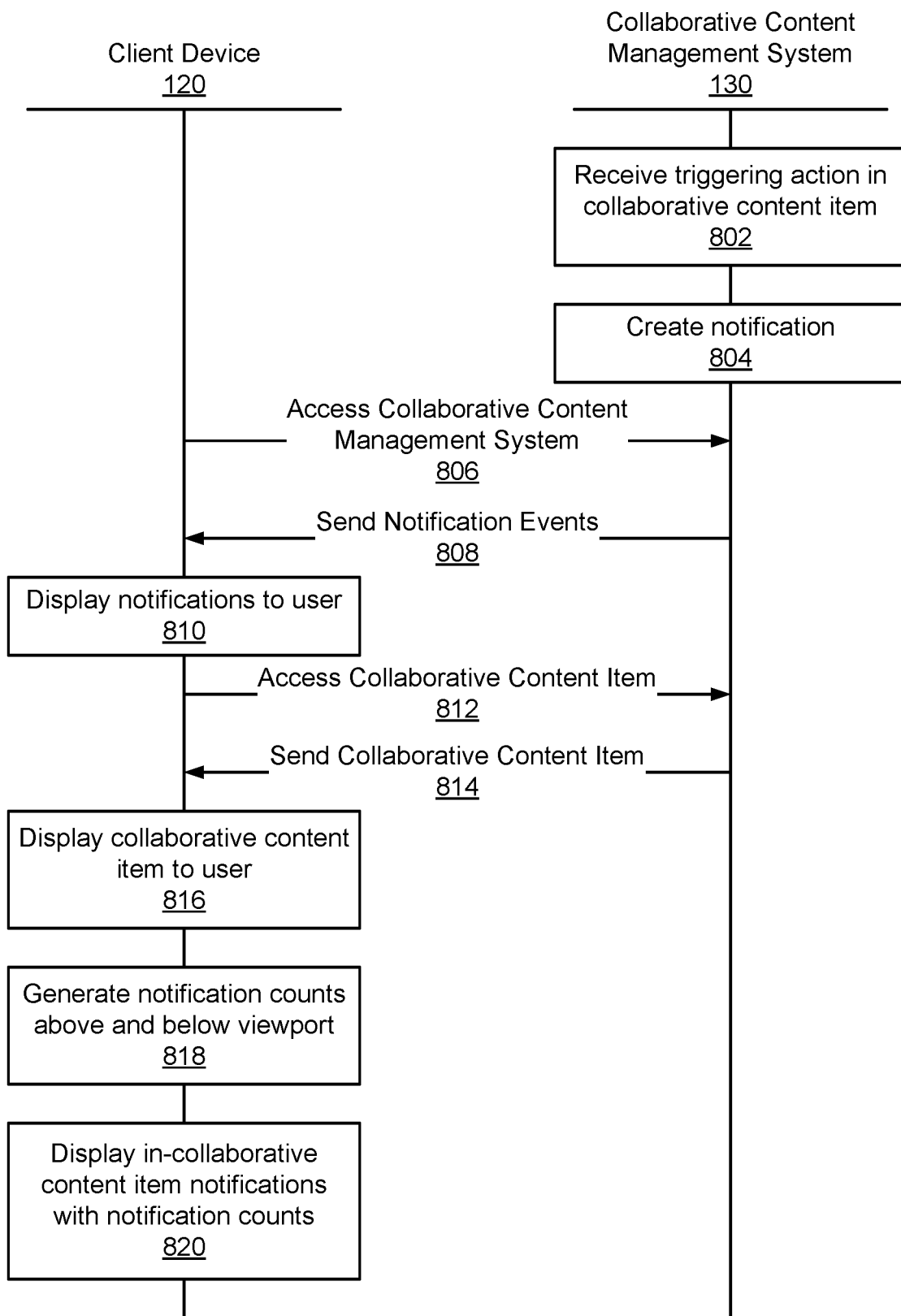
FIG. 8A is an interaction diagram showing one embodiment of displaying an in-collaborative content item notification.
Figure 8B:
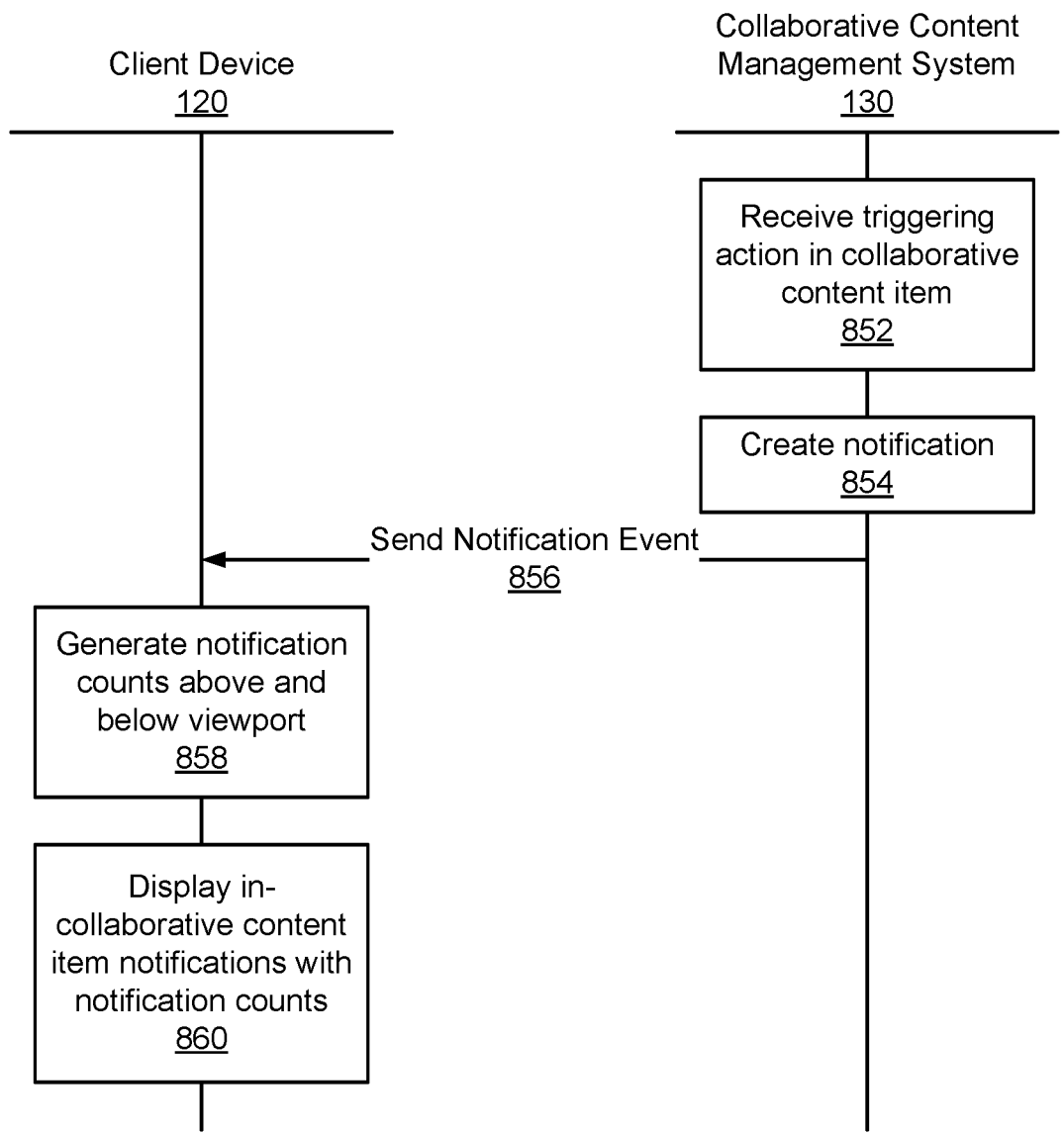
FIG. 8B is an interaction diagram showing one embodiment of updating in-collaborative content item notifications while a collaborative content item is being displayed.

FIG. 8A is an interaction diagram showing a method for displaying an in-collaborative content item notification to a viewing user. FIG. 8B is an interaction diagram showing a method for updating in-collaborative content item notifications while a collaborative content item is being displayed to a viewing user. FIG. 9A shows an example of a viewport superimposed over a collaborative content item that has multiple notification events associated with it. FIG. 9B shows an example user interface with a portion of the collaborative content item and graphical elements adjacent to the top and bottom edges of the viewport. For ease of description, the interaction diagrams shown in FIGS. 8A and 8B will be discussed below in conjunction with the examples shown in FIGS. 9A and 9B.

When the collaborative content management system 130 receives 802 a triggering action, e.g., based on input such as an edit or a new comment from a user, the collaborative content management system 130 creates 804 a notification. Specifically, the collaborative content management system 130 creates 804 a new notification event 702 for the notification and creates 804 a separate notification recipient descriptor 704 for the users who will receive the notification. In some implementations, the collaborative content management system 130 can receive multiple triggering actions from a large number of users and create a new notification event and one or more notification recipient descriptors 704 for each one. After creating a notification, collaborative content management system 130 can optionally send the notification to some or all of the recipients (e.g., via email, text message, in a notification pane of a webpage, a notification tray of a client application, or some other form of electronic communication).

When the viewing user uses his or her client device 120 to access 806 the collaborative content management system 130, the collaborative content management system 130 identifies the notification recipient descriptors 704 that list the viewing user's user identifier as in the RecipientID element. The collaborative content management system 130 sends 808, to the client device 120, the notification events 702 that have a notification recipient descriptor 704 with a RecipientID element that matches a userID associated with a user of the client device 120. The client device 120 displays 810 the notifications to the user. For example, if the user accessed 806 the collaborative content management system 130 by navigating a web browser to the user interface shown in FIG. 6, the collaborative content management system 130 can send 808 the notification events 702 to the client device 120, e.g., as part of an HTTP response or AJAX transaction. The client application 200 uses the elements of the notification events 702 in the HTTP response or AJAX transaction to generate and display 810 the notifications in the notification list 604.

When the viewing user accesses 812 a collaborative content item, the collaborative content management system 130 sends 814 the collaborative content item to the client device 120 and the client application 200 displays 816 a portion of the collaborative content item within a viewport of the application to a user. The client application 200 may select the initial position of the viewport based on the manner in which the viewing user accesses 812 the collaborative content item. For example, a viewing user may access 812 the collaborative content item by selecting the collaborative content item from the list of collaborative content items 602 shown in the example user interface of FIG. 6. In this case, the client application 200 may display 816 the collaborative content item with the viewport at the beginning of the document. Alternatively, if the viewing user has previously viewed the same collaborative content item, the client application may display 816 the collaborative content item with the viewport at the position where the viewing user last closed the collaborative content item. As another example, the viewing user may access 812 the collaborative content item by selecting a notification about a change in the collaborative content item (e.g., by selecting a notification in the notification list 604 shown in FIG. 6). In this case, the client application 200 may display 816 the collaborative content item with the viewport at a position so that the content span of the selected notification is visible.

The client application 200 also generates 818 notification counts of the number of notification events 702 associated with content spans above and below the viewport. The viewport is the portion or window of the client application 200 in which the content is displayed, apart from any portion of the user interface used for control panes, menus, or other tools.

Referring to FIG. 9A, a collaborative content item 902 titled "Draft Opinion: Gibbons v. Ogden" is shown in its entirety (this illustration is schematic and is not how the user interface of the client application would appear). The viewport 904 is an area that defines the boundaries of the portion of the collaborative content item that is visible, e.g., in a screen or window, in the client application 200. The viewport has a top edge 906 and a bottom edge 908. The portion of the collaborative content item 902 along the left end of the top edge 906 is referred to herein as the starting point, and the portion along the right end of the bottom edge 908 is referred to herein as the ending point. By extension, the portion of the collaborative content item between the starting point and the ending point is the portion of the collaborative content item that is visible in the viewport.

Notification events can be associated with content spans anywhere in a collaborative content item, and the purpose of the notification counts is to count the number of notification events associated with content spans outside of the viewport 904, such as those above the starting point and below the ending point. More particularly, the top notification count is the number of notification events associated with content spans above the starting point, and the bottom notification count is the number of notification events associated with content spans below the ending point.

In the example shown in FIG. 9A, the letter "d" 910 in the line beginning "different parts of the same State . . . " is the starting point along the left end of the top edge 906 of the viewport 904. Similarly, the last character "d" 912 in the line ending "that power must be exercised" is the ending point along the bottom edge 908 of the viewport 904. The visible portion is the portion of the collaborative content item between those two points. The top notification count in this example is 1 (not shown) because there is one notification event associated with a content span above the starting portion—another user has inserted the viewing user's user primitive along with the text "please edit this part" 914 at the beginning of the collaborative content item content. The bottom notification count is also 1 because there is one notification event associated with a content span below the ending position—the user J_Marshall has added the comment "How do you like this ending?" 916 to a thread that was started by the viewing user.

After generating the notification counts, the client application 200 displays 820 in-collaborative content item notifications that show the notification counts to the viewing user. Referring to the example shown in FIG. 9B, the visible portion of the collaborative content item 902 shown schematically in FIG. 9A is displayed within a user interface provided by the client application 200. In this example, the in-collaborative content item notifications are graphical elements 918 and 920, displayed adjacent to the top and bottom edges 906 and 908 of the viewport 904. More particularly, a top graphical element 918 is displayed adjacent to the top edge 906 and contains the top notification count of 1; meanwhile, a bottom graphical element 920 is displayed adjacent to the bottom edge 908 and contains the bottom notification count of 1. If one or both of the notification counts are 0, the user interface is displayed without the corresponding graphical element.

Referring to FIG. 8B, the collaborative content management system 130 can also receive 852 a triggering action in a collaborative content item while the client device 120 is already displaying the collaborative content item to the viewing user. The collaborative content management system 130 creates 854 a notification in the same manner as described above, by creating a new notification event 702 and one or more notification recipient descriptors 704. However, instead of sending the notification event in response to the client device 120 accessing the collaborative content management system 130, as described in FIG. 8A, the collaborative content management system 130 sends 856 the notification event on a push basis to the client device 120 or in response to periodic polling by the client device 120.

After receiving the notification event, the client application 200 generates 858 new notification counts above and below the viewport to account for the new notification event. The client application 200 updates the in-collaborative content item notifications so that they are displayed 860 with the new notification counts. For example, suppose the client device 120 receives a new notification event associated with the content span "They may so entangle and perplex" in the second-to-last sentence of the example collaborative content item 902 shown in FIGS. 9A and 9B while the client device 120 is displaying the collaborative content item 902. After receiving the new notification event, the client application 200 updates the bottom notification count to have a value of 2 instead of 1, and it updates the bottom in-collaborative content item notification so that a "2" replaces the "1" in the bottom graphical element 912.

Moving the Content of the Collaborative Content Item Relative to the Viewport

Figures 10, 11:
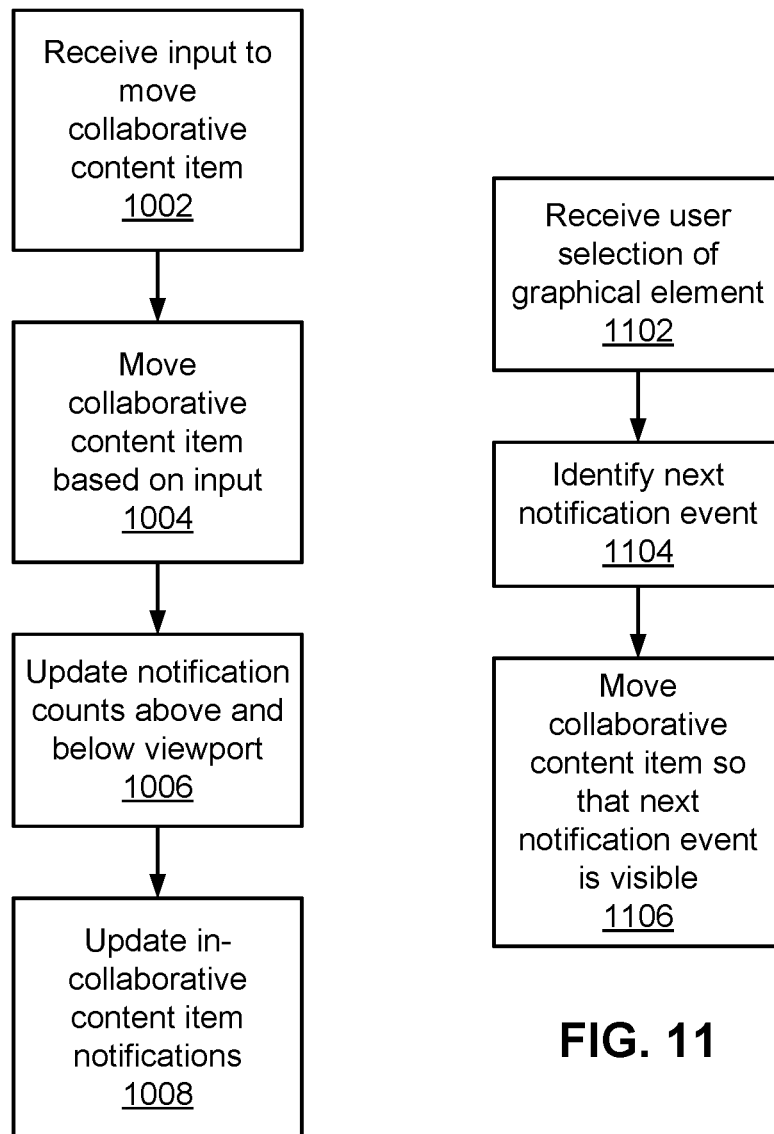
FIG. 10 shows one embodiment of updating the graphical elements in response to the content of the collaborative content item moving within the viewport.
FIG. 11 shows one embodiment of moving the content of the collaborative content item in response to a user selection of a graphical element.

FIG. 10 shows one embodiment of a method for updating the in-collaborative content item notifications in response to the content of the collaborative content item moving within the viewport of the client application 200. The client application 200 receives 1002 an input to move the content of the collaborative content item either up or down within the viewport of the client application 200. For example, this input can be from a user or a programmatic command, such as a JavaScript event that triggers a scroll command. In response, the client application 200 moves 1004 the content of the collaborative content item based on the input, which causes the content of the collaborative content item to move relative to the viewport. By extension, the starting and ending points of the collaborative content item's visible portion also move, and a different portion of the collaborative content item is visible in the screen window of the client application 200.

Because moving the content of the collaborative content item causes the starting and ending points of the collaborative content item's visible portion to change, it is possible that a content span that was previously above the starting point or below the ending point now falls within the collaborative content item's visible portion. For this reason, the client application 200 updates 1006 the top and bottom notification counts based on the new starting and ending points of the collaborative content item's visible portion.

The client application 200 updates 1008 the in-collaborative content item notifications to display the updated top and bottom notification counts. If one of the notification counts has an updated value of 0, then the client application 200 does not display the corresponding in-collaborative content item notification.

Referring back to the collaborative content item 902 shown in FIG. 9B, inputs to move the content of the collaborative content item can include an interaction with the scroll bar 922, a scrolling gesture performed somewhere in the viewport 904, a paging control, a selection of the top or bottom graphical elements 918, 920 (described in further detail below with reference to FIG. 11), typing new text that extends past the bottom edge of the viewport, execution of a scroll command (e.g. scroll( ) scrollTo( ) or scrollBy( )), manual or programmatic resizing, addition, or removal of elements in the collaborative content item (e.g. based on JavaScript or style triggers), etc. For illustrative purposes, suppose the client application 200 receives 1002 a user input to move the content of the collaborative content item 902 so that the very beginning of the collaborative content item 902 is visible, and the client application 200 moves 1004 the content of the collaborative content item accordingly, for example by scrolling or paging the collaborative content item. As a result, the new starting point is the beginning of the line "@I_Kant please edit this part" (shown in FIG. 9A), and the value of the top notification count becomes 0 when it is updated 1006 because there are no notification events associated with any content spans above the new starting point. The client application 200 updates 1008 the in-collaborative content item notifications by displaying the collaborative content item 902 without the top graphical element 918.

FIG. 11 shows one embodiment of a method for moving the content of the collaborative content item in response to a user selection of a graphical element. The client application 200 receives 1102 a user selection of one of the graphical elements 918 or 920. In response, the client application 200 identifies 1104 the notification event associated with the next content span above the starting point (if the viewing user selected the top graphical element 918) or below the ending point (if the viewing user selected the bottom graphical element 912). The client application 200 moves 1106 the content of the collaborative content item so that the content span of the identified notification event is in the visible portion of the collaborative content item. In other words, the client application moves 1106 the collaborative content item so that the new starting point is above the content span and the new ending point is below the content span. In various implementations, the client application 200 moves 1106 the content of the collaborative content item so that the content span is proximate to the starting point or proximate to the ending point or moves 1106 the content of the collaborative content item so that the content span is centered in the viewport.

Referring again to the example shown in FIG. 9B, suppose the client application 200 receives 1102 a selection of the bottom graphical element 912. For example, the viewing user may select the bottom graphical element 912 by clicking on it (if using a desktop or laptop computer) or by tapping on it (if using a computing device with a touchscreen). The client application 200 identifies 1104 the notification event associated with the first content span below the ending position. Here, the next notification event is the comment "How do you like this ending?" that the user J_Marshall added to the comment thread associated with the content span "Powerful and ingenious minds" (shown in FIG. 9A). The client application 200 moves 1106 the content of the collaborative content item so that the ending point is below this content span while the starting point is above this content span. As a result, the content span and the comment are now in the visible portion of the collaborative content item.

This method of moving the content of the collaborative content item in response to a user selection of a graphical element is an advantageous improvement because it allows the user to quickly jump to and view the next notification event in the collaborative content item. This ability to jump to the next notification allows the user to view the subject of the notification without having to search for it by manually scrolling through the collaborative content item. Furthermore, updating the in-collaborative content item notifications as they are selected allows the user to quickly cycle through each unread notification in a collaborative content item in the context of the each notification's content span.

Modifying Notifications

Figure 12:
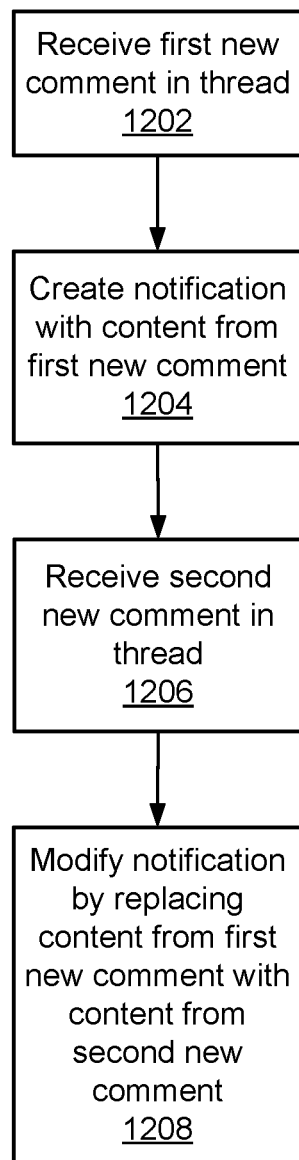
FIG. 12 shows one embodiment of modifying a notification when multiple comments are added to the same comment thread.

FIG. 12 shows one embodiment of a method for modifying a notification when multiple comments are added to the same comment thread. The collaborative content management system 130 receives 1202 a first new comment in a thread to which the viewing user has already added a comment. Because this is a triggering action, the collaborative content management system 130 creates 1204 a notification by creating a new notification event 702 and a notification recipient descriptor 704 for each user who will receive the notification. One of the notification recipient descriptors 704 identifies the viewing user. The NotificationContent element of the notification event 702 is the content of the first new comment.

The collaborative content management system 130 receives 1206 a second new comment in the same comment thread after creating 1204 the notification but before the notification is displayed to the viewing user (i.e., the State element of the notification recipient identifier 704 still has a value of unread). When the second new comment is received 1206, the collaborative content management system does not create a new notification. Instead, the collaborative content management system 130 modifies 1208 the notification event 702 that was created for the first comment by updating NotificationContent to be the content of the second comment.

Referring back to the example in FIG. 9A, the user J_Marshall added a new comment to the comment thread that the viewing user I_Kant created. After receiving 1202 this first comment, the collaborative content management system 130 creates a new notification event 702 with the text of J_Marshall's new comment ("How do you like this ending?") as the NotificationContent element. The collaborative content management system 130 also creates a new notification recipient identifier 704 whose RecipientID value is the user identifier for the viewing user I_Kant.

If I_Kant accesses the collaborative content management system 130 and views his unread notifications (e.g., by accessing the user interface shown in FIG. 6), then the notification is displayed on the client device 120 of user I_Kant and the collaborative content management system 130 marks the notification as read by changing the State element of the notification recipient identifier 704 to have a value of "read." However, suppose instead that J_Marshall adds another comment to the same comment thread before I_Kant has an opportunity to view the notification that was created 1204 for the first comment. For example, suppose J_Marshall adds a comment with the content "I'm quite proud of it!" to the comment thread. If this occurs, then the collaborative content management system 130 modifies the NotificationContent element of the existing notification event 704 to replace "How do you like this ending?" with "I'm quite proud of it!" As a result, when the viewing user I_Kant accesses the collaborative content management system 130 to view his unread notifications, a single notification is displayed for the comment thread to which J_Marshall added two comments. This method of modifying an existing notification rather than creating separate notifications is an advantageous improvement because displaying separate notifications for the new comments in the thread can be redundant since they all relate to the same thread.

In another embodiment, the collaborative content management system 130 performs this method of modifying a notification upon receiving multiple new comments in a thread regardless of whether the first notification has been read. In this embodiment, the collaborative content management system 130 also changes the State element of the notification recipient identifiers 704 associated with the notification to unread; this way, users who have already read the notification for the first new comment are still alerted to the fact that the notification has changed.

After the collaborative content management system 130 performs this method for modifying a notification, the collaborative content management system 130 may also update the notification counts and graphical elements accordingly. In one embodiment, a thread with unread comments is counted only once when the collaborative content management system 130 generates the notification counts, regardless of how many unread comments are in the thread. In another embodiment, each unread comment in a thread is counted separately when the collaborative content management system 130 generates the notification counts. In this embodiment, if the user selects one of the graphical elements to move the content of the collaborative content item to a thread with multiple unread comments (e.g., because the thread is the subject of the notification event whose content span is the next content span above the starting point or below the ending point), the client application 200 can indicate (e.g., by highlighting) the comments within the thread that were counted in the notification count. This can be especially advantageous for comments added to already-long comment threads because it allows the user to quickly identify the comments within the thread that he or she has not yet read.

Additional Configuration Considerations

Reference in the specification to "one embodiment," "an embodiment," "in some implementations," or similar, means that a particular feature, structure, or characteristic described in connection with the embodiments is included in at least one embodiment. The appearances of these phrases in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting 'at least one of' an element or another element refers to any possible permutation of the set of elements. For example, claim language reciting 'at least one of A and B' or 'at least one of A or B' means A, B, or both A and B."

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   receiving, at a client device, one or more notification events indicating a change to text of a collaborative content item made by a first user occurring outside of a portion of the collaborative content item that is presently displayed to a second user, the change comprising a primitive that is linked to the second user;
   responsive to receiving the one or more notification events indicating the change outside of the portion of the collaborative content item that is presently displayed to the second user:
     updating a notification interface that is displayed with the portion of the collaborative content that is presently displayed to the second user to reflect the change; and
     providing for display to the second user, along with the presently displayed portion of the collaborative content item, the notification interface, the notification interface indicating a direction of the collaborative content item in which the change occurred without displaying the change with the presently displayed portion of the collaborative content item.

2. The method of claim 1, wherein updating the notification interface comprises:
   determining a number of changes presently indicated by the notification interface; and
   incrementing the number of changes presently indicated by the notification interface based on the change.

3. The method of claim 2, wherein the number of changes corresponds to a direction relative to the presently displayed portion of the collaborative content item.

4. The method of claim 1, further comprising:
identifying a change that is closest to, but outside of, the presently displayed portion of the collaborative content item; and
responsive to receiving a user selection of a navigation element of the notification interface, navigating to the change by updating the presently displayed portion of the collaborative content item to include the change.

5. The method of claim 1, wherein the change comprises a comment embedded in the collaborative content item.

6. The method of claim 1, wherein the notification interface is a viewport.

7. The method of claim 1, wherein the notification interface is an overlay element embedded on top of the presently displayed portion of the collaborative content item.

8. A non-transitory computer-readable storage medium storing instructions that, when executed by a computing system, cause the computing system to perform operations comprising:
receiving, at a client device, one or more notification events indicating a change to text of a collaborative content item made by a first user occurring outside of a portion of the collaborative content item that is presently displayed to a second user, the change comprising a primitive that is linked to the second user;
responsive to receiving the one or more notification events indicating the change outside of the portion of the collaborative content item that is presently displayed to the second user:
updating a notification interface that is displayed with the portion of the collaborative content that is presently displayed to the second user to reflect the change; and
providing for display to the second user, along with the presently displayed portion of the collaborative content item, the notification interface, the notification interface indicating a direction of the collaborative content item in which the change occurred without displaying the change with the presently displayed portion of the collaborative content item.

9. The non-transitory computer-readable storage medium of claim 8, wherein updating the notification interface comprises:
determining a number of changes presently indicated by the notification interface; and
incrementing the number of changes presently indicated by the notification interface based on the change.

10. The non-transitory computer-readable storage medium of claim 9, wherein the number of changes corresponds to a direction relative to the presently displayed portion of the collaborative content item.

11. The non-transitory computer-readable storage medium of claim 8, further comprising:
identifying a change that is closest to, but outside of, the presently displayed portion of the collaborative content item; and
responsive to receiving a user selection of a navigation element of the notification interface, navigating to the change by updating the presently displayed portion of the collaborative content item to include the change.

12. The non-transitory computer-readable storage medium of claim 8, wherein the change comprises a comment embedded in the collaborative content item.

13. The non-transitory computer-readable storage medium of claim 8, wherein the notification interface is a viewport.

14. The non-transitory computer-readable storage medium of claim 8, wherein the notification interface is an overlay element embedded on top of the presently displayed portion of the collaborative content item.

15. A system comprising:
memory; and
one or more processors;
wherein the memory includes instructions that, when executed by the one or more processors, cause the system to perform operations comprising:
receiving, at a client device, one or more notification events indicating a change to text of a collaborative content item made by a first user occurring outside of a portion of the collaborative content item that is presently displayed to a second user, the change comprising a primitive that is linked to the second user;
responsive to receiving the one or more notification events indicating the change outside of the portion of the collaborative content item that is presently displayed to the second user:
updating a notification interface that is displayed with the portion of the collaborative content that is presently displayed to the second user to reflect the change; and
providing for display to the second user, along with the presently displayed portion of the collaborative content item, the notification interface, the notification interface indicating a direction of the collaborative content item in which the change occurred without displaying the change with the presently displayed portion of the collaborative content item.

16. The system of claim 15, wherein updating the notification interface comprises:
determining a number of changes presently indicated by the notification interface; and
incrementing the number of changes presently indicated by the notification interface based on the change.

17. The system of claim 16, wherein the number of changes corresponds to a direction relative to the presently displayed portion of the collaborative content item.

18. The system of claim 15, further comprising:
identifying a change that is closest to, but outside of, the presently displayed portion of the collaborative content item; and
responsive to receiving a user selection of a navigation element of the notification interface, navigating to the change by updating the presently displayed portion of the collaborative content item to include the change.

19. The system of claim 15, wherein the change comprises a comment embedded in the collaborative content item.

20. The system of claim 15, wherein the notification interface is a viewport.

* * * * *